UNITED STATES PATENT OFFICE.

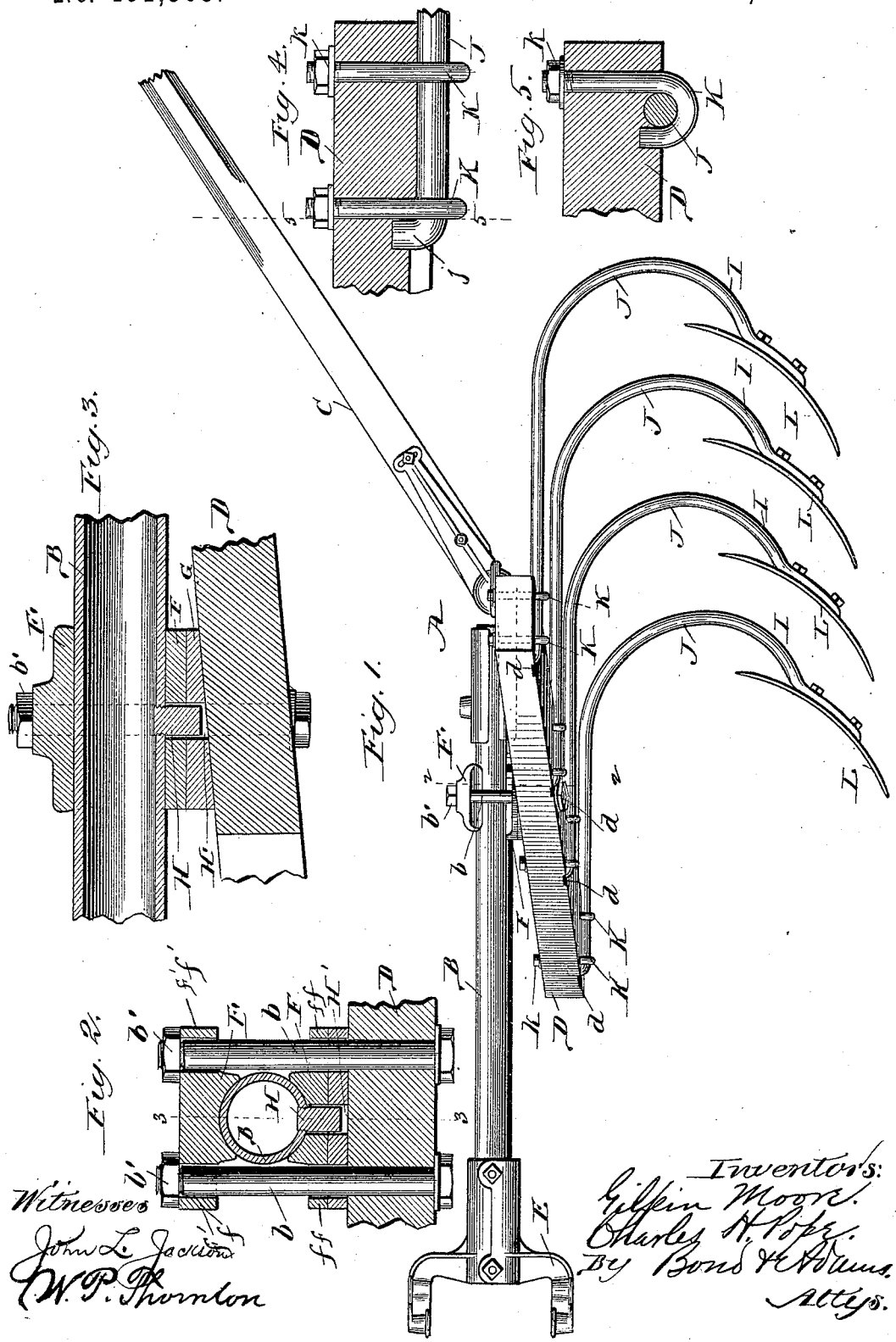

GILPIN MOORE AND CHARLES H. POPE, OF MOLINE, ILLINOIS, ASSIGNORS TO DEERE & COMPANY, OF SAME PLACE.

CULTIVATOR.

SPECIFICATION forming part of Letters Patent No. 461,503, dated October 20, 1891.

Application filed February 24, 1891. Serial No. 382,380. (No model.)

*To all whom it may concern:*

Be it known that we, GILPIN MOORE and CHARLES H. POPE, both of Moline, in the county of Rock Island and State of Illinois, and citizens of the United States, have invented certain new and useful Improvements in Cultivators, of which the following is a specification, reference being had to the accompanying drawings, in which—

Figure 1 is a perspective view. Fig. 2 is a vertical cross section on line 2 2 of Fig. 1. Fig. 3 is a longitudinal vertical section on line 3 3 of Fig. 2. Fig. 4 is a detail, being a vertical cross-section of the cross-bar, showing the manner of securing the teeth in place; and Fig. 5 is a detail, being a vertical section on line 5 5 of Fig. 4.

Our invention relates to cultivators, and particularly to that class of cultivators which are provided with teeth made of spring metal adapted to give when a root or other hard substance is struck by the shovel.

The object of our invention is to improve this character of cultivators; and it consists in the features of construction and the combination or arrangement of devices hereinafter described and claimed.

In the drawings, A indicates a cultivator-gang, of which B is the beam, C the handle, and D the cross-bar. The beam B is cylindrical in shape, and is preferably made of tubular iron or steel to secure lightness and strength. The forward end of the beam B is provided with a clevis attachment E, secured to it in any suitable manner and adapted to receive the necessary apparatus for hitching the draft-animal to the cultivator. The handle C is attached to the rear end of the beam B in any suitable manner.

The cross-bar D, to which are secured the cultivator-teeth, is secured at its center to the beam B, near its rear end, by bolts $b$, the bar D being so adjusted as to form an acute angle with the beam B, as best shown in Fig. 1. The plane of the bar D also is so adjusted as to form a small angle with the plane of the beam B, as best shown in Fig. 3, in order to give to the upper part of the teeth a slight upward and backward slant.

In order to clamp the beam B and bar D securely together and prevent rotation of the bar D on the beam B, clamps F F' are provided at the upper and lower portions of the beam B, the lower clamp F being between the bar D and the beam, as best shown in Fig. 2. The clamp F rests upon a wedge-shaped disk G, which rests upon the bar D, the wedge G being of such shape as to hold the clamp F in a horizontal position. The disk G, however, forms no part of our present invention. The clamps F F' are hollowed out on their inner surfaces to fit and clamp the beam B and are provided with ears $f f'$, which extend a short distance on each side of the clamps, which ears are provided with holes adapted to receive the bolts $b$, by means of which the clamps are secured together and to the bar D. The bolts $b$ are secured in place by nuts $b'$, or in any other suitable manner. In order to prevent the clamps F F' and bar D from rotating on the beam B, the beam B is provided at a suitable point on its lower surface with a pin or projection H, which is formed in or secured to the beam. The pin H is adapted to fit into a hole H', which is formed in the clamp F at a suitable point. By this construction the bar D and clamps F F' are effectually prevented from rotating about the beam B.

J J indicate the cultivator-teeth, which are curved, as best shown in Fig. 1, and are made of spring metal. The teeth J are circular in cross-section, by which construction the greatest strength possible is obtained for the amount of material used, allowing the teeth to be made very light. This construction also permits of a lateral spring, as well as of a backward and forward elasticity, and the teeth are thereby adapted to move sidewise to avoid stones or other obstacles. The small size to which the teeth may be reduced by reason of their circular cross-section presents the least possible surface for the accumulation of rubbish, and the teeth will cut through all ordinary impeding substances. In order to further adapt the teeth to pass through such rubbish without accumulating it, they are bent sharply near their lower ends, as best shown at I in Fig. 1. The upper ends of the teeth J are fitted in diagonal slots $d$, formed in the under side of the bar D at such an angle that the teeth will project backward in the line of draft of the cultivator, and are secured therein by means of bolts K, which pass through the bar and are curved at their lower ends in such manner as to be adapted to encircle the ends of the teeth J, as best shown in Fig. 5. The curved ends of the bolts K are adapted to enter holes suitably placed in the under side of the bar D, and the bolts K are provided at their upper ends with nuts $k$, by means of which the bolts may be drawn upward to tightly clamp the teeth against the bar D. In order to further secure the teeth in place they are each provided at their upper ends with a short upward projection $j$, adapted to enter a suitable hole in the under side of the bar, as best shown in Fig. 4. To rigidly secure the teeth J in place, two bolts K should be used for each tooth, as indicated in the drawings. The teeth J are provided at their lower ends with shovels L, which are of the usual construction and are secured to the teeth in any suitable manner.

While the round teeth herein described are more particularly adapted for use on cultivators, we do not wish to limit our invention to cultivators alone, as it may be applied with equally beneficial results to harrows and other farming implements.

We have shown our improvements as applied to a single gang of shovels which is adapted to use by a direct hitch of the team; but it is evident that it may be used with its duplicate in connection with an axle, so as to produce a straddle-row cultivator, or with several sections to produce a harrow.

What we claim as our invention, and desire to secure by Letters Patent, is—

1. A cultivator consisting of a beam B, a cross-bar D, carrying spring-teeth J, having attached shovels L, a clamp F, resting upon the cross-bar and engaged with a part of the beam, the clamp F', resting against the upper side of the beam, and the bolts $b$, passing vertically through the cross-bar and the clamps at opposite sides of the beams, substantially as described.

2. A cultivator consisting of a cylindrical beam B, a cross-bar D, carrying spring-teeth J, having attached shovels L, a clamp F, resting on the cross-bar, engaging a part of the beam and having a curved seat in which the beam rests, the clamp F', arranged above the beam and having a curved seat therefor, and bolts $b$, passing vertically through the cross-bar and the clamps at opposite sides of the cylindrical beam, substantially as described.

3. The combination, with a circular beam B, having a projection H on its under side, bar D, and teeth J, secured to said bar, of clamps F F', adapted to secure the bar D to the beam B, said clamp F being provided with an indentation adapted to receive the projection H, substantially as and for the purpose specified.

GILPIN MOORE.
CHARLES H. POPE.

Witnesses:
W. L. VELIE,
J. E. POOLE.